M. U. BERNHEIM.
SYSTEM FOR HANDLING FREIGHT AND BAGGAGE.
APPLICATION FILED AUG. 4, 1910. RENEWED JUNE 4, 1914.
1,124,272.
Patented Jan. 12, 1915.
10 SHEETS—SHEET 1.
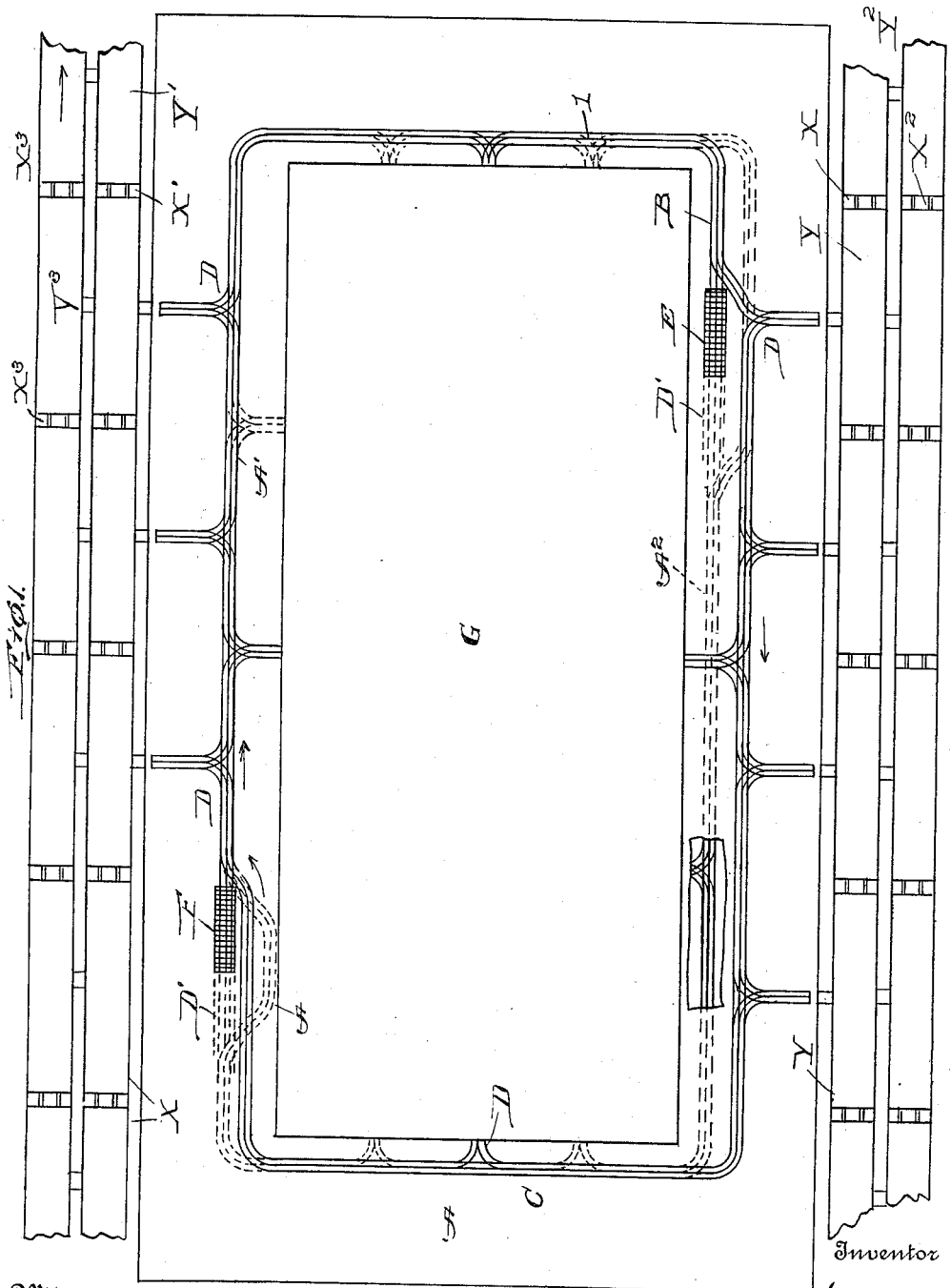

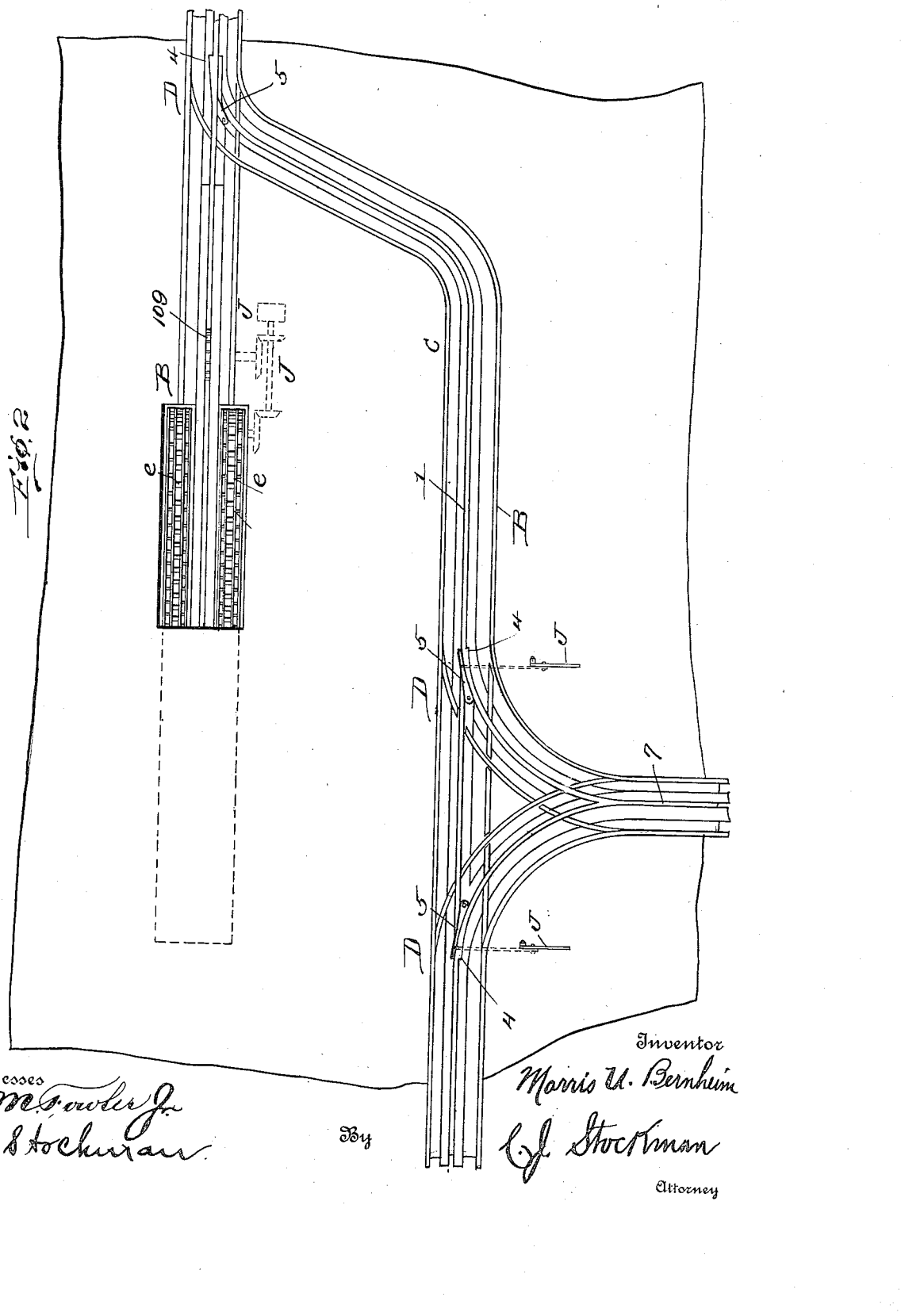

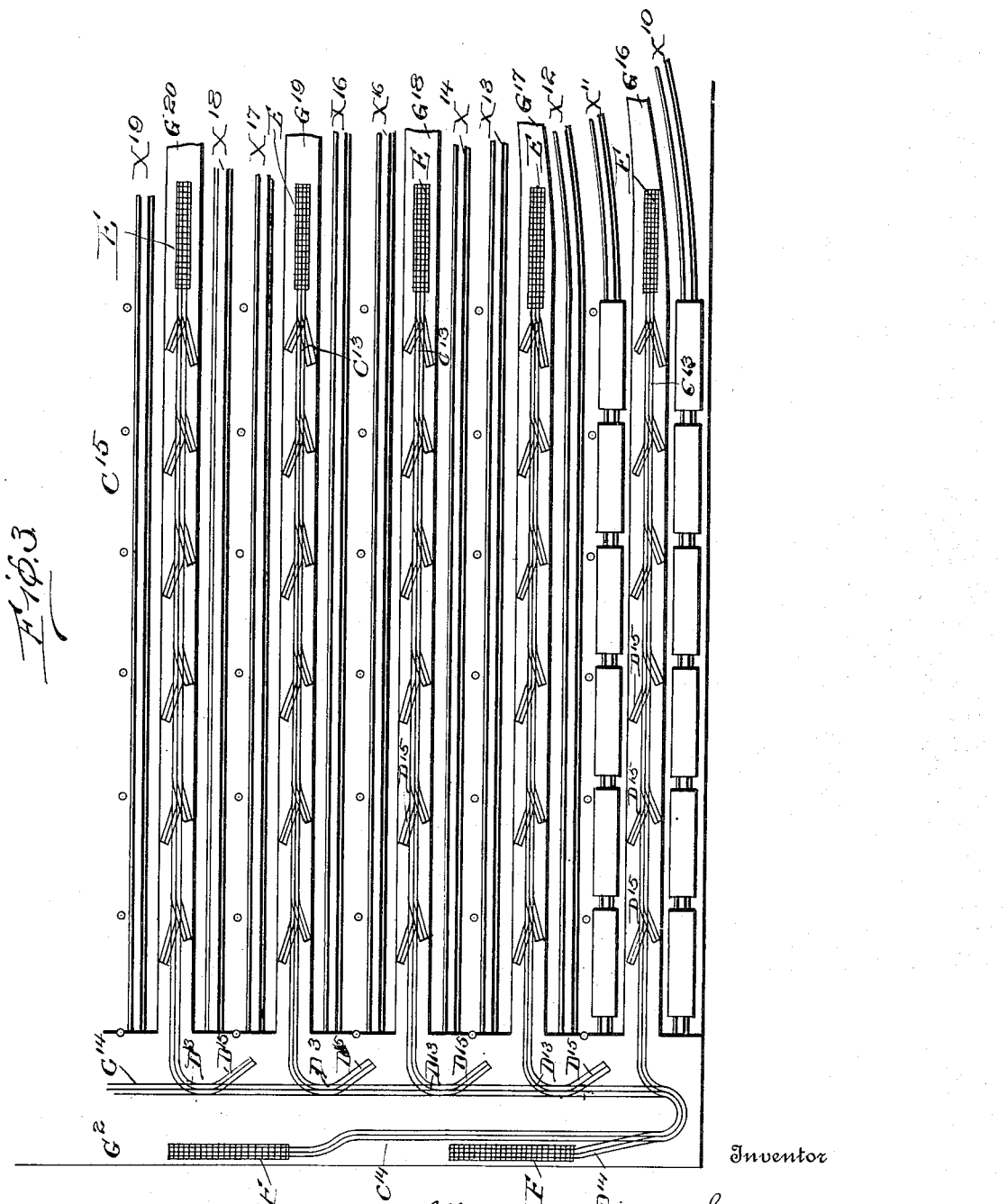

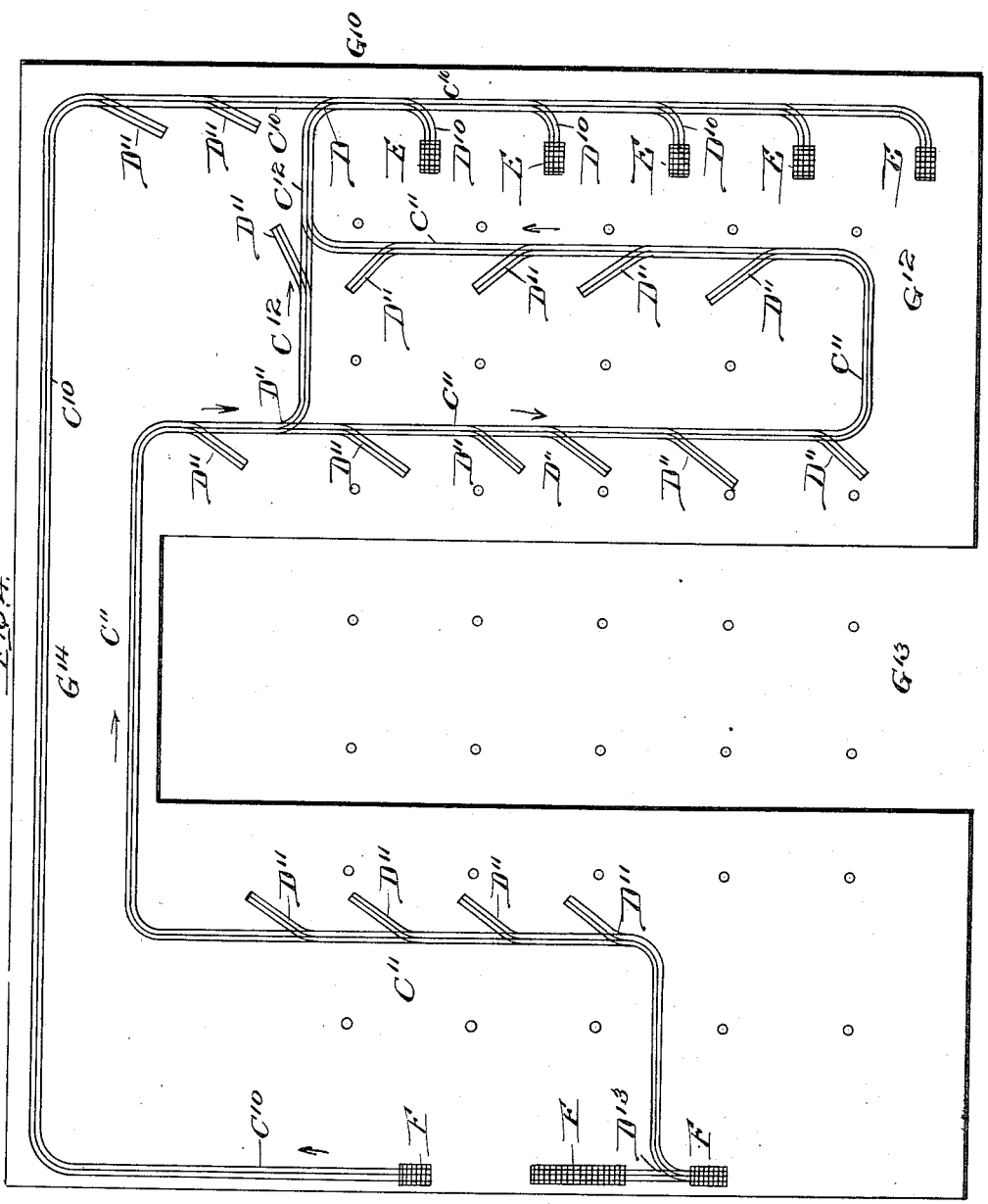

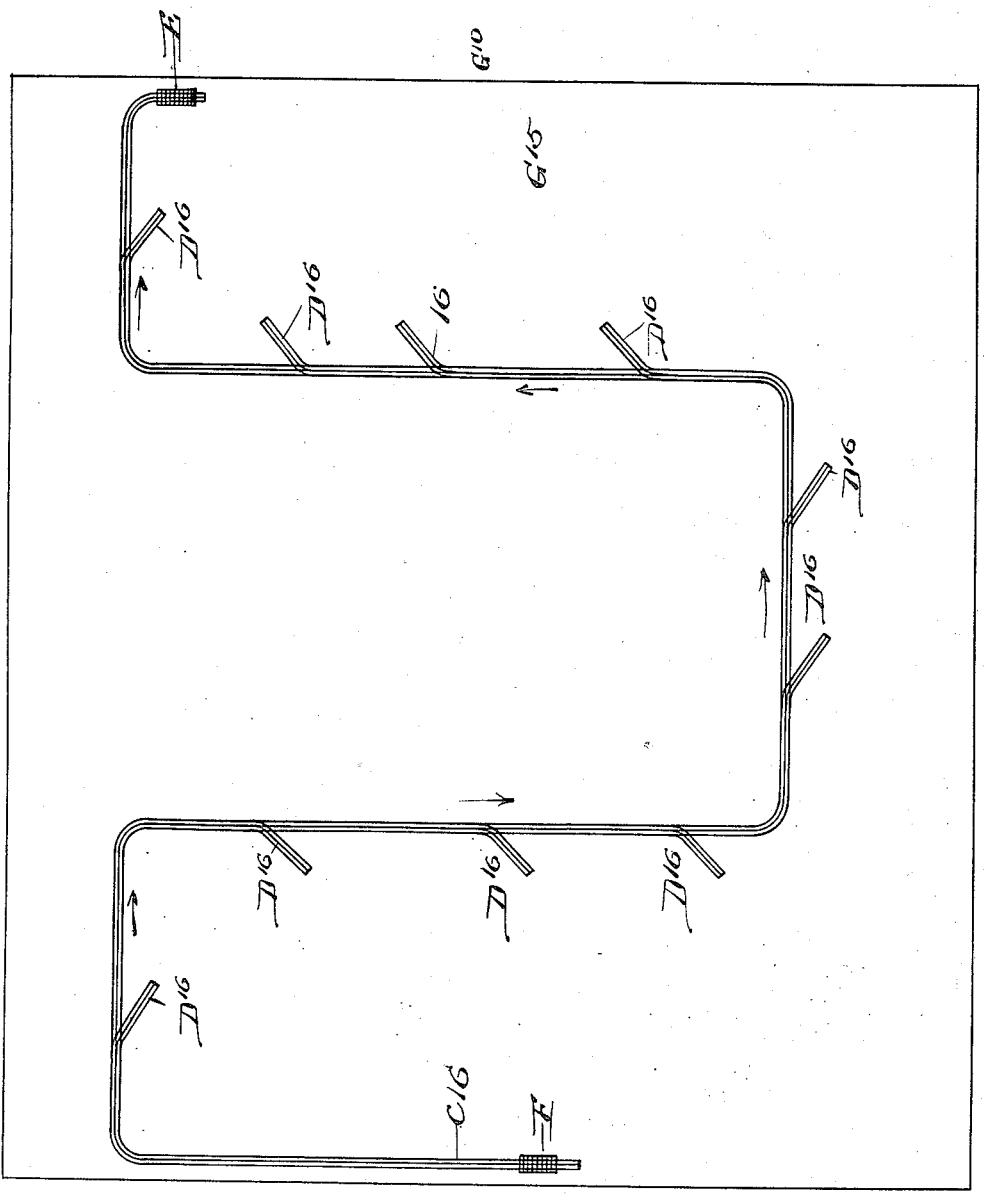

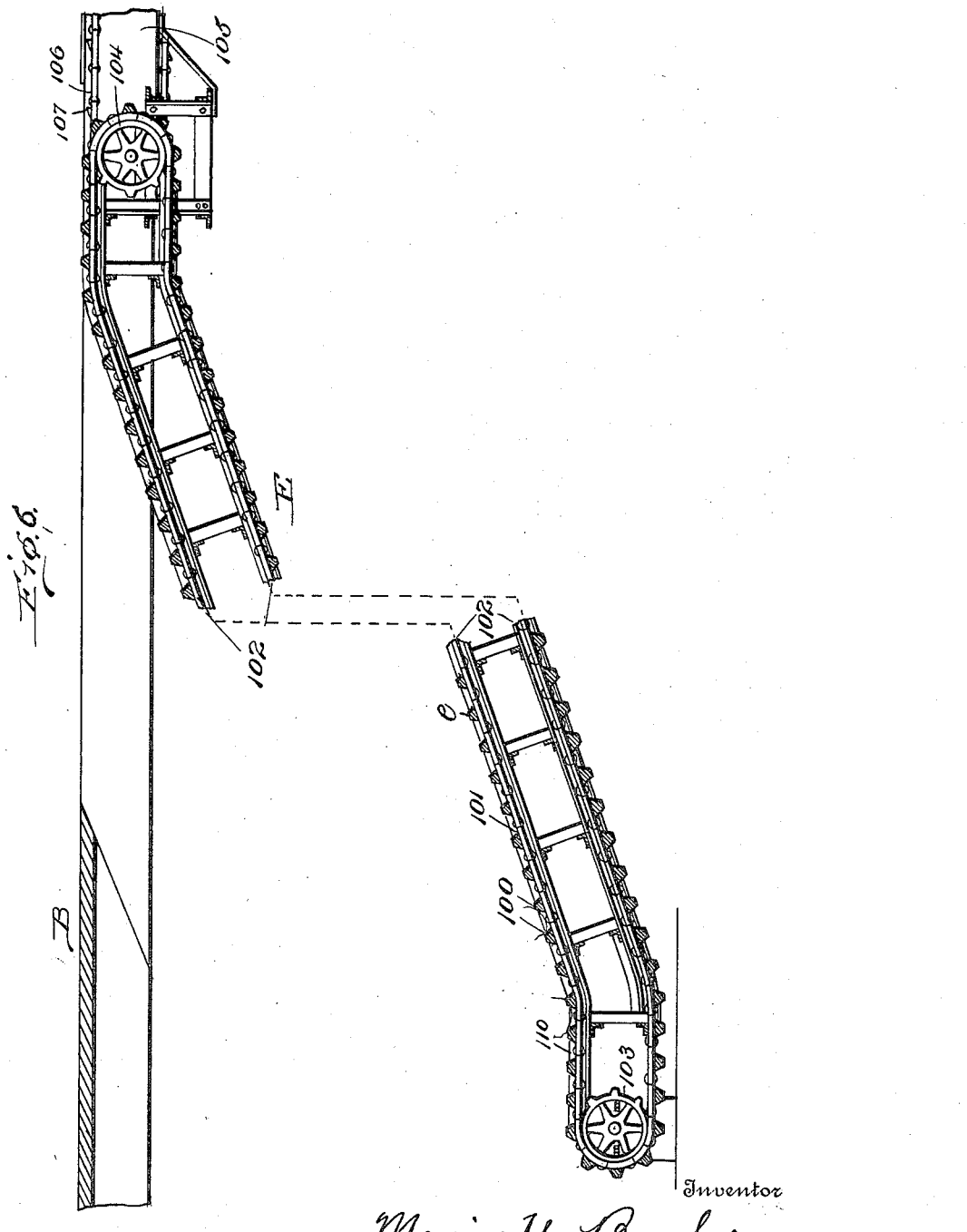

M. U. BERNHEIM.
SYSTEM FOR HANDLING FREIGHT AND BAGGAGE.
APPLICATION FILED AUG. 4, 1910. RENEWED JUNE 4, 1914.
1,124,272.
Patented Jan. 12, 1915.
10 SHEETS—SHEET 7.
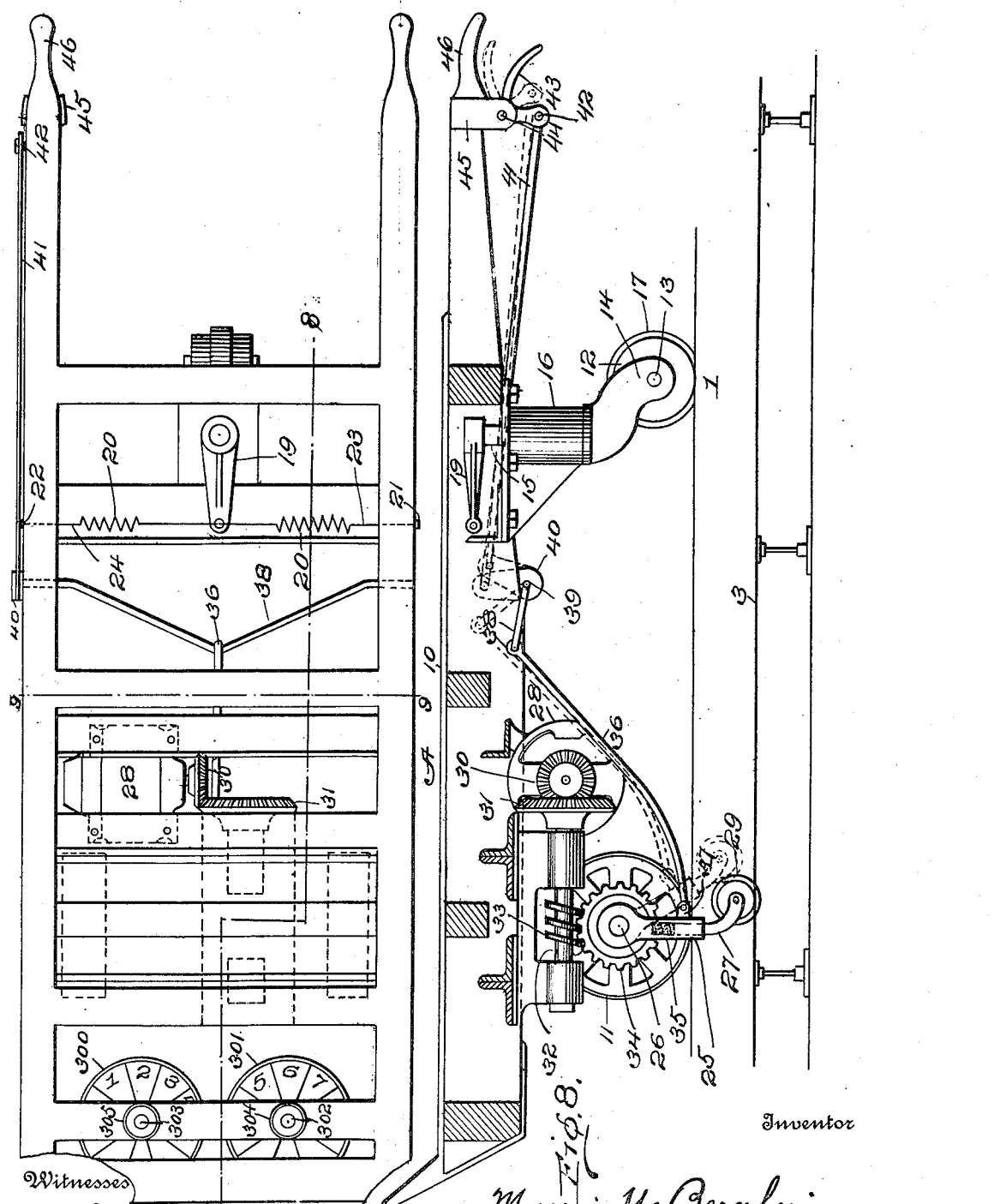

M. U. BERNHEIM.
SYSTEM FOR HANDLING FREIGHT AND BAGGAGE.
APPLICATION FILED AUG. 4, 1910. RENEWED JUNE 4, 1914.
1,124,272.
Patented Jan. 12, 1915.
10 SHEETS—SHEET 8.
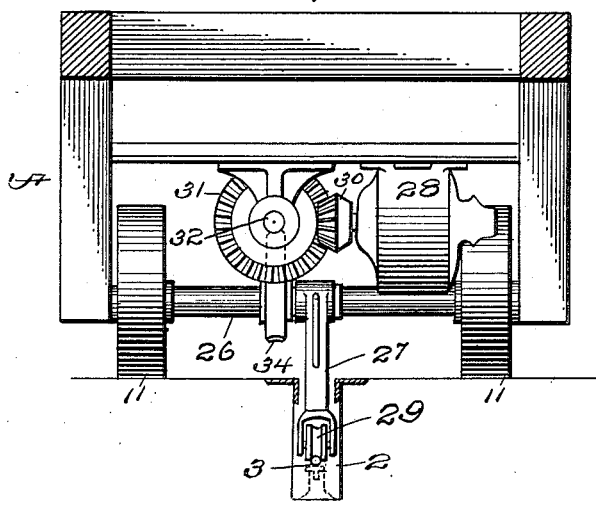
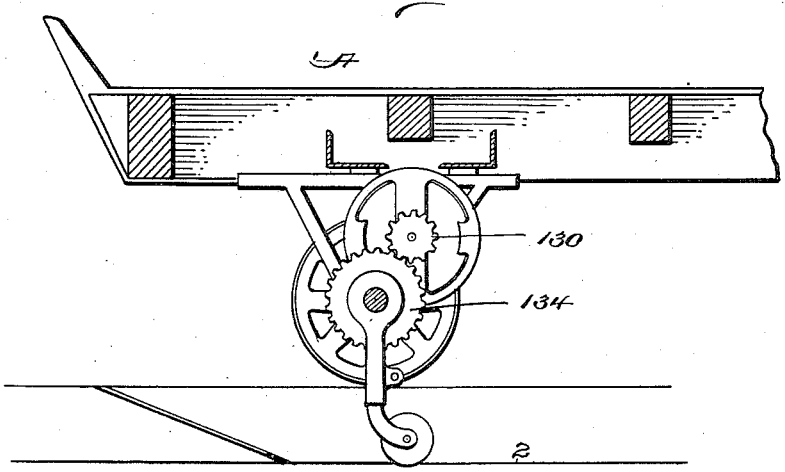

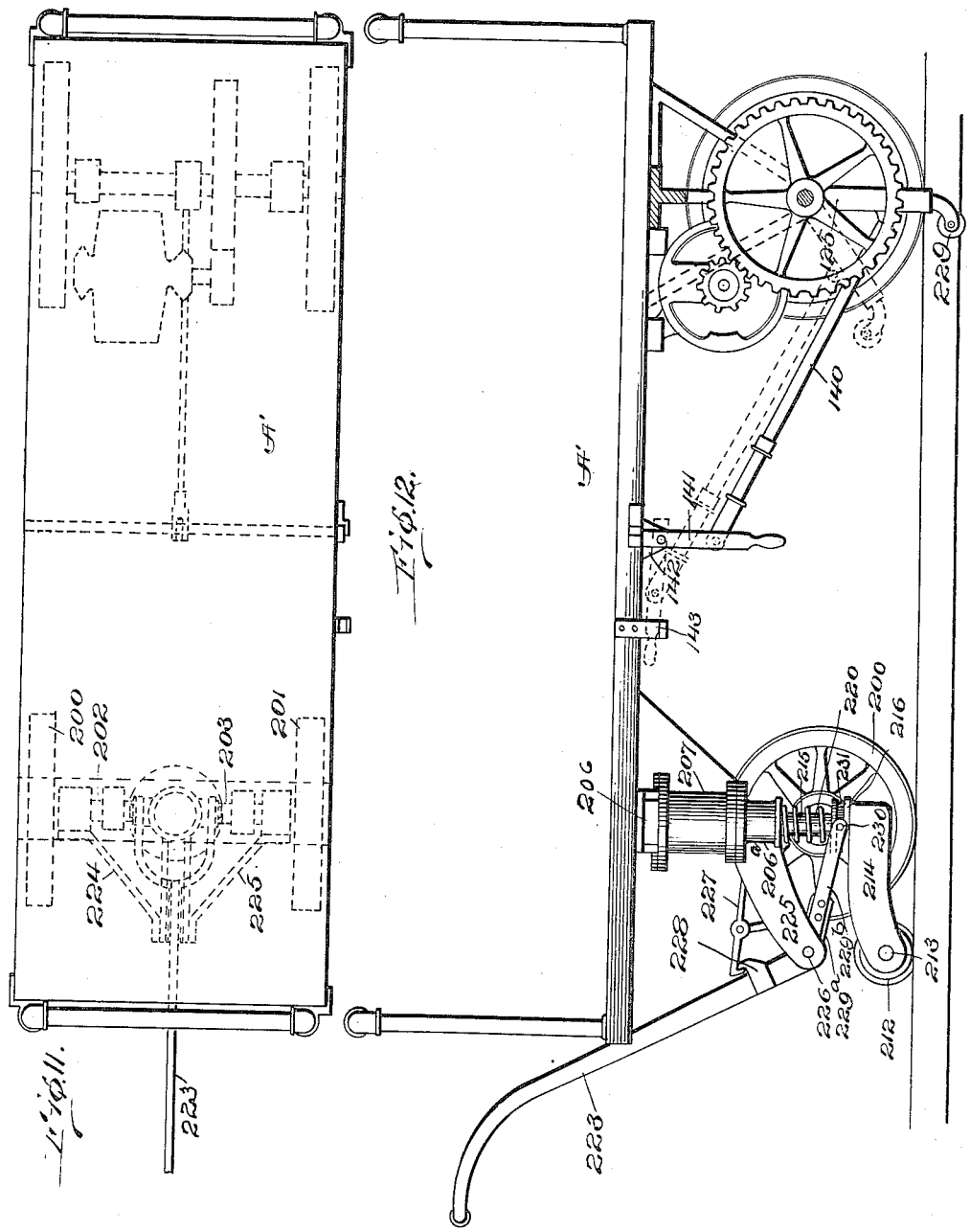

M. U. BERNHEIM.
SYSTEM FOR HANDLING FREIGHT AND BAGGAGE.
APPLICATION FILED AUG. 4, 1910. RENEWED JUNE 4, 1914.
1,124,272.
Patented Jan. 12, 1915.
10 SHEETS—SHEET 10.
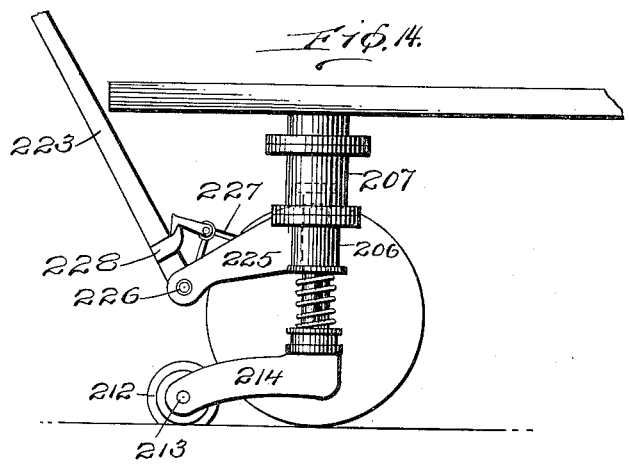
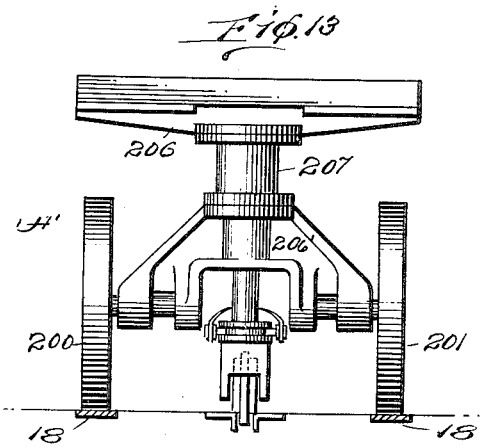
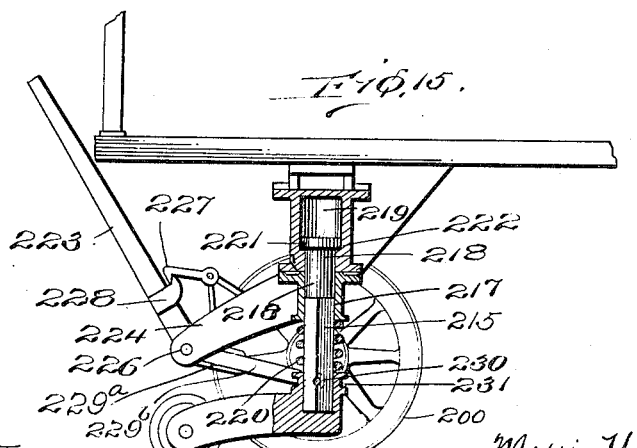
Witnesses
J. M. Fowler Jr.
A. Stockman
Inventor
Morris U. Bernheim
By C. J. Stockman
Attorney

UNITED STATES PATENT OFFICE.

MORRIS U. BERNHEIM, OF LOUISVILLE, KENTUCKY, ASSIGNOR TO THE ALVEY-FERGUSON COMPANY, OF OAKLEY, CINCINNATI, OHIO, A CORPORATION OF OHIO.

SYSTEM FOR HANDLING FREIGHT AND BAGGAGE.

1,124,272.          Specification of Letters Patent.      Patented Jan. 12, 1915.

Continuation in part of application Serial No. 517,450, filed September 13, 1909. This application filed August 4, 1910, Serial No. 575,511. Renewed June 4, 1914. Serial No. 843,092.

*To all whom it may concern:*

Be it known that I, MORRIS U. BERNHEIM, a citizen of the United States, residing at Louisville, in the county of Jefferson and State of Kentucky, have invented new and useful Improvements in Systems for Handling Freight and Baggage, of which the following is a specification.

The main or ultimate object of the present invention is to provide a system for handling freight or baggage at railway stations, which will have many new and severally useful features contributing to the production of a system for loading and unloading freight and baggage, which in a most economical manner will answer very exacting requirements as to the volume of matter which must be handled within a given time and as to the disposition that is to be made of such matter, and further will save much of the manual labor now required to handle the freight and baggage at these places.

Another of the objects of the invention is to provide a system for handling freight and baggage, upon trucks or other suitable carriers, which, without resorting to the use of straight lift elevators, will transfer the carriers from one level to another, and will afford provision for their diversion severally to their various destinations: as, for example, by a continuous travel thereof from one train to another train waiting upon the same level to receive the freight or baggage from the first train; or from a train or trains to a station or stations for inbound freight, on a different level, convenient to a place for the delivery thereof to the teams which deliver them to the consignees: or from said inbound station or stations to a station or stations for outbound freight, when it is to be transferred to an outgoing train not ready to receive it, or from said inbound station to a storage station or stations on a different level; or from said outbound station, which is conveniently arranged to receive freight or baggage from teams, to any one of various trains arranged on a different level from that of the outbound station; or from the storage station or stations to the inbound or outbound stations referred to and thence delivered to teams or carried below to the trains.

A still further object of the invention is to provide a novel means for electrically propelling the trucks upon a level, which will have important advantages for use in a system of the type herein exemplified.

There are other objects which will hereafter appear.

The invention consists in certain peculiarities in the construction of parts, and in certain novel combinations and arrangements of elements substantially as hereinafter described and particularly pointed out in the subjoined claims.

In the accompanying drawings there are illustrated what are considered to be the most desirable typical embodiments of the invention, and it is to be understood that the invention is not restricted to the details of these embodiments as many changes may be made in such details and the invention otherwise variously embodied without departing from its spirit or the scope of the subjoined claims, wherein like characters of reference designate like parts in the several views.

Figure 1 is a diagrammatic plan view illustrating a railway station provided with my system, and illustrating one embodiment thereof, with a part of the floor broken away to disclose the portion of the system beneath the same, on the lower floor, other parts of the system on the lower floor being shown in dotted outline. Fig. 2 is an enlarged detail view illustrating the parts at a place where the trucks are transferred from one level to another. Figs. 3, 4 and 5 are views illustrative of a second embodiment of the invention, wherein the trains are on one level, and the freight house with its inbound, outbound and storage places are on two different levels above the train level. In these figures, Fig. 3 is a diagrammatic view of the lowermost or train level: Fig. 4 is a diagrammatic view of the intermediate level and Fig. 5 is a diagrammatic view of the topmost level. Fig. 6 is a vertical section, representing two floors of a railway transfer or freight house, and showing the means employed for transferring the trucks from one of these floors to the other. Fig. 7 is a plan view of the underside of one form of truck which may be employed in the system. Fig. 8 is a longitudinal vertical section on the line 8—8 of Fig. 7. Fig. 9 is a transverse section on the line 9—9 of Fig. 7. Fig. 10 is a vertical longitudinal section of the forward end of a modified form of a truck. Fig. 11 is a plan view of a four-wheel truck adapted to the system. Fig. 12 is a side elevation of the same. Fig. 13 is a front elevation of the truck with parts omitted. Fig. 14 is a detail view of a truck wherein the guide wheel is not connected with the handle. Fig. 15 is a detail vertical section showing the connection of the guide wheel with the bolster.

In the present system it is intended to transfer the freight or baggage upon wheeled carriers, those exemplified being two and four-wheel trucks A and A' respectively, which, except, as to features hereinafter set forth, necessary to adapt them to the present system, may be of the usual construction of freight or baggage trucks intended to be manually propelled. These carriers are propelled upon a way or ways located upon different levels. These ways are provided by one or more platforms or floors of a railway transfer house, freight shed or warehouse, for example.

As already stated, there are illustrated in the accompanying drawings two systems, each embodying a plurality of floors or levels with means for conveying the trucks upon and between the same. The systems illustrated are suited to materially different conditions as regards the arrangement of the railway tracks with respect to the freight or baggage house and the level at which the freight or baggage is received from or delivered to teams, and also as regards the number of levels upon and between which the trucks are conveyed. It should be understood that these systems are illustrated merely to exemplify different practicable and desirable arrangements, and it is apparent that they will serve this purpose and also will suggest various arrangements suited to various conditions. It is therefore to be understood that the invention is not restricted to these particular embodiments and that many and various embodiments thereof apparently widely different from those herein illustrated, may be made and are contemplated to be within the spirit of the invention and the scope of the subjoined claims.

Referring to Fig. 1 there is shown a system wherein a freight or baggage house G is encircled by a platform H and is disposed between railway tracks as X, X', $X^2$ and $X^3$, any number of which are arranged on opposite sides thereof. The platform is preferably arranged on a level with the floors of the cars of the trains Y, Y', $Y^2$ and $Y^3$ on said tracks and below this level there is a second floor or platform I, which may be employed for the storage of the freight or baggage, or for its delivery to or its receipt from wagons. It will of course be understood that the portion of the house marked G in Fig. 1 may be covered, and that the baggage or freight may be received from or delivered to the wagons at the level of the floor thereof or platform H, in lieu of at the level of the floor I, whichever is more convenient.

In the system exemplified in Figs. 3, 4 and 5 the railway tracks, marked $X^{10}$—$X^{19}$ both inclusive are below the level at which the baggage or freight is received from or delivered to the wagons and the latter level is below a level upon which the baggage or freight may be stored. In this system as herein illustrated the house $G^{10}$, is, as shown in Fig. 4 divided into two portions $G^{11}$ and $G^{12}$, with an open space $G^{13}$ between them. The portion $G^{11}$ may desirably be utilized for inbound freight or baggage and the portion $G^{12}$ for outbound freight. The space $G^{13}$ between them affords facilities for the wagons which deliver the baggage or freight to or receive the same from the station. This space does not extend from one side to the other of the building and hence a passageway $G^{14}$ is left through which the portions $G^{11}$ and $G^{12}$ of the building have communication with each other. Preferably the floors of said portions $G^{11}$ and $G^{12}$ and passageway $G^{14}$ are at such a height above the street as to be approximately on a level with the floors of the wagons. As shown in Fig. 5 there is an uppermost floor $G^{15}$ having communication with the lower floor shown in Fig. 4, through the means hereinafter set forth: and as shown in Fig. 3 there is at the train level any suitable number of platforms, suitably disposed with reference to the tracks. These platforms are marked $G^{16}$, $G^{17}$, $G^{18}$, $G^{19}$ and $G^{20}$ in said figure and they are connected with each other at one end by a transverse platform $G^{21}$.

The platforms $G^{16}$–$G^{21}$, inclusive, are preferably arranged on the level of the floors of the cars on the tracks $X^{12}$-$X^{19}$ inclusive. In all of the various embodiments of the invention each floor or platform provides a way for the trucks A and A' and is provided with means for propelling the trucks thereover. Moreover they are connected with each other by endless traveling platforms E and F arranged at suitable places for conveying the trucks from one to the other. These endless traveling platforms may be of identical construction and their directions of movement preferably are such that certain of them will serve to lower the trucks and others to raise the same. Those first mentioned are designated as lowerers and marked E while the others are called elevators and are marked F. The means referred to for propelling the trucks over the several ways comprise what is herein termed a main line or lines in each way, having switches or branch lines leading therefrom to predetermined places. These lines define the movements of the trucks.

As will be seen upon reference to Fig. 1 the main line C on the upper floor extends continuously around the portion G of the house upon the platform H, and its switches or branch lines D tap the main line at intervals, some of them extending toward the tracks and being at distances apart approximately the same as that between the doorways of cars; others of them extending toward the building and still others extending between the main line and the upper ends of the elevator F and lowerer E. The main line C' on the lower floor of this system similarly extends continuously around the floor and has branch lines or switches leading therefrom in any required direction, including some, shown in dotted lines in Fig. 1 and marked D', extending between the main line and the lower ends of the elevator and lowerer, respectively. In the other exemplified system there are several main lines on the various floors so connected with each other as conveniently to conduct the trucks to their several destinations. Thus in Fig. 4 there is shown a line, marked $C^{10}$ extending from an elevator F in the inbound portion $G^{11}$, along the portion $G^{14}$ and into outbound portion $G^{12}$, within which latter it is connected with a series of lowerers E, by switches $D^{10}$ and a curved section $D^{12}$, said curved section forming one terminal of the main line. These lowerers E extend from the level of the team floor down to the several platforms $G^{16}$–$G^{20}$ while the elevator F referred to, at the other terminus of the main line $C^{10}$ extends from the platform $G^{21}$. A second elevator F extends from said platform $G^{21}$ into the inbound portion $G^{11}$, and from it leads a second main line $C^{11}$, which extends through the connecting portion $G^{14}$ and around within the outbound portion $G^{12}$. The line $C^{10}$ with its described elevators and lowerers is particularly intended for the transfer of freight or baggage from any car on any one of the tracks $X^{10}$–$X^{19}$ inclusive to any other car on said tracks. The line $C^{11}$ with its elevator is particularly intended for the handling of freight or baggage destined for the station $G^{10}$ and also freight or baggage destined for another station reached by a train not ready to receive it, as well as for freight or baggage received at said station from the teams and destined for another station. It is associated within the outbound portion $G^{12}$ with a branch $C^{12}$ which connects two of its branches with each other and also taps the line $C^{10}$. The line $C^{11}$ is also provided with a series of branch lines or switches $D^{11}$ within the inbound and outbound portions $G^{11}$ and $G^{12}$ extending to various parts thereof and the line $C^{10}$ is similarly tapped by branch lines or switches $D^{11}$ which may be used to deliver goods to the portion $G^{12}$ if desired. Upon each of the platforms $G^{16}$–$G^{20}$ inclusive a branch line $C^{13}$ extends from the base of each lowerer E from the outbound portion $G^{12}$ to a line $C^{14}$ extending around the platform $G^{21}$. This line $C^{14}$ is connected with each line $C^{13}$ by a switch $D^{13}$ and one of its ends terminates adjacent to the elevator which connects it with the line $C^{10}$ while its other end is connected by a branch line $D^{14}$ with the elevator F which leads to the line $C^{11}$. This line $C^{14}$ is further tapped by branch lines or switches $D^{15}$ enabling trucks to be diverted therefrom onto the platform $G^{21}$ when desired and each line $C^{13}$ is tapped at proper intervals by branch lines or switches $D^{15}$ for the diversion of the trucks therefrom onto the platforms $G^{16}$–$G^{20}$ respectively. These branch lines or switches $D^{15}$ are preferably arranged at distances apart approximately equal to the distances between doorways of cars and extend toward such doorways and serve to divert the trucks from their several lines $C^{13}$. Upon the uppermost floor $G^{15}$, shown in Fig. 5, there is a main line marked $C^{16}$ which extends in any suitable direction or directions from the elevator F in the inbound portion $G^{11}$ of the floor beneath, to a lowerer E leading from the floor $G^{15}$ to the outbound portion $G^{12}$, the base of the last mentioned lowerer preferably being suitably connected with the line $C^{10}$. This line $C^{15}$ also is tapped at suitable intervals by switches or branch lines $D^{16}$ serving to divert the trucks therefrom at adjacent places where the baggage is to be stored.

From the foregoing it will be seen that the system illustrated in Figs. 3, 4 and 5 may be used as follows: When it is desired to transfer freight or baggage from any car on any one of the tracks to a car standing on any of the other tracks, a truck after being loaded from the first car is placed on the main line $C^{13}$ on the platform adjacent to said car, and is propelled by said main line to the elevator F which will conduct it to the main line $C^{10}$ on the floor above, and from this main line it is directed to the lowerer leading to the particular line $C^{13}$ which serves the track on which stands the second car, and is diverted from said line $C^{13}$ at a place adjacent to said car.

Trucks containing freight or baggage which have reached their destinations or are to be delivered to outbound trains not ready to receive them, are carried by the appropriate main line $C^{13}$ to the main line $C^{14}$ and are diverted from the latter by the switch $D^{14}$ to the elevator F which will conduct them to the main line $C^{11}$, and are diverted from said main line $C^{11}$ at any appropriate place. This place may be within the inbound portion $G^{11}$ or within the outbound portion $G^{12}$, according to whether the freight or baggage has reached its destination or it is to be delivered to another train not ready to receive it. When the train last referred to is ready to receive the freight or baggage, a truck containing the latter is placed on an appropriate part of the line C¹¹ and delivered thence to the line C¹² which conducts it to the line C¹⁰ from which it is diverted to the appropriate lowerer, or it may be placed directly upon the line C¹², for delivery to the line C¹⁰, or even directly upon the line C¹⁰, whichever is more convenient.

When storage of the freight or baggage for comparatively prolonged periods is desired, or when for any other purpose it is desirable to conduct either inbound or outbound freight or baggage from the floor shown in Fig. 4 to an upper floor, it is delivered to the particular elevator F whose upper ends communicate with the line C¹⁶ shown in Fig. 5. This elevator is shown in Fig. 4 as arranged between the previously referred to elevators and as having its receiving end connected with the line C¹¹, at a place adjacent to the elevator leading to said line C¹¹, by a branch line and switch D¹³. The trucks may be diverted from the line C¹⁶ at various places, by the branch lines D¹⁶. As a lowerer E extends into this upper level from the level below, freight or baggage may be delivered by said lowerer to the floor below, for any disposition thereof that the case calls for. Preferably the line C¹⁶ extends to this lowerer for delivery of the freight or baggage thereto.

In the use of the system exemplified by Fig. 1 baggage or freight may be transferred from a car of one train to a car of another train, located for example on the opposite side of the platform conveniently by engaging it with the main line C at a place adjacent to that at which it is loaded and diverting it from said main line at a place adjacent to the car which is to receive its load. In the event that the truck contains freight or baggage which should be delivered into the lower room or upon the lower floor it is diverted from the main line at a place adjacent to the lowerer E, and is conducted by said lowerer to the lower floor and is then moved by the line on said floor from which it is diverted at any desired place. In the event that a storage place is provided on the upper level, and it is desired to deliver loaded trucks thereto, toward such storage place such truck may be diverted from the main line C on said level by the particular switch D located nearest thereto.

While reference has herein been made only to the travel of loaded trucks yet it is apparent that empty trucks may be propelled by any of the loading stations through paths provided by the several lines referred to, most convenient for the conduct of such trucks between predetermined stations. It will also be apparent that while the paths of the trucks set forth are highly convenient for the transfer of trucks between the places stated yet it is not essential that the trucks travel these particular paths between the places named. For example, the parts on the platforms, G¹⁶–G²⁰ which have been described as lowerers may be utilized as elevators, with the corresponding reversal of direction of the movements of the parts which have been described as lowerers and intermediate levels and also a corresponding reversal of travel of the trucks on the two levels. Again the lines on the two upper floors may be variously arranged to suit the requirements of various installations, all within the spirit of the invention. It should also be understood that attendants are located wherever necessary along the lines of travel of the trucks and at the various loading and unloading stations to attend to the proper disposition of the trucks.

Having now exemplified desirable arrangements of lines and travels of the trucks, the preferred construction of said lines and of the trucks and platforms will now be set forth.

Each main line preferably comprises a groove 1 formed in its way and means to propel the trucks upon said way. This means preferably is located beneath the surface of the way and is of a kind which enables it to impart movement to the truck on the way through the intervention of a suitable element which projects into engagement therewith from each truck and travels in the groove 1. The herein illustrated embodiment of the invention is of the underground-conductor type, and, therefore, there is illustrated a conduit tube containing a conductor 3, which is placed in such relation to the groove that a suitable conducting element carried by each truck may project through the groove into electrical contact with the conductor 3, as herein set forth. It is apparent however that features of the invention lend themselves to the utilization of other means for propelling the trucks than those of an electrical nature and also that overhead trolleys may be employed, in lieu of underground conductors, without departing from the spirit of the invention or the scope of subjoined claims. It is preferred, however, whether the power be of an electrical nature or of a mechanical nature (as an endless traveling chain for instance); that it be arranged below the plane of the way and be associated with a groove which will exercise a guiding function upon the trucks as well as afford a convenient means for access to the power transmitting element referred to.

The groove of each main line is provided at intervals with lateral openings 4 at which the trucks are diverted therefrom, suitable means, as switch points 5, being employed adjacent to said openings to guide the trucks from the main line onto the branch lines. As already stated these branch lines lead to predetermined places, as, for example, to places contiguous to cars which are to be loaded or unloaded, to storage places, to places convenient to wagons, and to elevators or lowerers, according to the particular requirements of the installation. Each branch line preferably includes a groove in the way and a means in operative relation with the same for imparting movement to the trucks, which need not be referred to in detail herein, because, when employed they may be, and preferably are, identical with that in the several main lines. Preferably, however, the diverting means adjacent to the receiving ends of the lowerers and the elevators are unprovided with a power imparting means, in order that full control of the trucks by attendants will not in anywise be interfered with. This, however, is not essential, nor is it essential that any of the branch lines include power imparting means; though it is highly desirable in any case to provide grooves in all the branch lines.

The several switch points 5 are provided with suitable means, indicated generally at J in Fig. 2, for throwing them so as either to break the continuity of the main and establish communication therewith of one or more of the switches or branch lines, or to close communication of the main line with the switches or branch lines. These points, of course, will be severally controlled, either from a common station, or from separate stations, as desired. As a particular means for throwing the points is not essential to the invention and different means adapted to serve the purpose will suggest themselves to those skilled in such matters, it is considered to be unnecessary to describe any special one herein. Different forms of trucks are herein illustrated to exemplify what is believed to be suitable types for the present system.

Referring to the forms shown in Figs. 7, 8 and 9, the platform 10 of the truck, designated A in these figures, is mounted upon two wheels 11 at the front and upon a wheel 12 at the rear. This rear wheel is mounted upon a horizontal axis 13 which is borne by a yoke 14 provided with a vertical spindle 15, extending through a sleeve 16, which sleeve forms a bearing for the spindle and projects from the platform 10. The wheel 12 is thus free to swing upon a vertical axis as well as to rotate upon its horizontal axis. Its tread is provided with a flange 17 to travel in the grooves of the ways, and the remaining portion of the tread is arranged to run upon the way, the latter being preferably provided with wear plates 18 which are flush with the surface of the way and are arranged at opposite sides of the groove, to form tracks for said wheel. From the upper end of the spindle an arm 19 extends into engagement with cross-springs 20, which preferably have means for adjusting their tension. The tension-adjusting means here shown comprises nuts 21 and 22 which are threaded on the ends of rods 23 and 24, which project from the springs 20 and are suitably supported by the frame of the truck. A depending guiding means 25 is also arranged at the front of the truck and is adapted to travel in the grooves in the ways. In the exemplified form of the invention, this guiding means is a sleeve which is preferably suitably connected to the axle 26 upon which the wheels 11 are mounted, and through it extends an arm 27 the upper end of which is properly electrically connected with an electric motor 28, while the lower end carries the contact element 29 which engages the conductor 3. This contact element is preferably a rotative one, as shown, and the conductor may be either a wire or a rail as desired. The sleeve 25 obviously should be insulated from the arm 27 and it is apparent that any suitable electrical motor may be employed and that suitable electrical connections, whereby the current from the conductor 3 may be availed of to drive the motor, will readily suggest themselves to those persons familiar with such matters. For this reason I do not consider it necessary particularly to illustrate the construction of the electric motor or the circuit-forming means herein. Power derived from this motor is transmitted to the driving wheels of the truck in the exemplified form of the invention, through the intermeshing gears 30 and 31, shaft 32, worm 33, gear 34 and axle 26. The contact element 29 is yieldably held to the conductor 3 by a spring 35 which presses thereagainst and is mounted in the sleeve 25 as shown in dotted lines in Fig. 8.

For reasons which will hereinafter fully appear it is desirable at times to disconnect the truck from the main and branch lines and to adapt it to be manually propelled to and from said lines. The guide sleeve 25 is, therefore, pivotally mounted so that it, and the arm 27 and contact element 29, may be turned into or above the plane of the upper surface of the way. A very desirable means for accomplishing this adjustment, consists of a link or lever 36 which is pivoted at 37 to the sleeve 25 below the fulcrum of the latter and extends thence rearward to the cranked portion 38 of a shaft 39 which extends transversely of the truck. This transverse shaft is journaled in the side members of the truck frame, and its ends are provided with short arms or cranks 40 to which the forward ends of links 41 are pivoted. The rear ends of these links 41 are pivoted at 42 to bent handles or grip pieces 43 which in turn are pivoted, between their ends, at 44, to brackets 45 which extend from the side members of the truck frame adjacent to the handles or grip portions 46 of the latter. The actuating elements 43 of the adjusting means are thus located in the most convenient position, as the attendant when grasping the truck handles 46 to move the truck may at the same time grasp the grip levers 43 and by moving the same toward said handles raise the sleeve 25 and contact element 29 out of the groove in the way, into the position shown in dotted outline in Fig. 8. If desired suitable means for holding the parts in adjusted position may be employed.

In lieu of the particular described gear connections between the motor and axle, other connections may be employed. For example, in Fig. 10, I have illustrated a simplified form of connection wherein the gear on the motor shaft directly intermeshes with the gear on the driving axle. One of these gears is marked 130 and the other 134.

In Figs. 11 and 12 a desirable construction of a four wheel platform truck A' embodying my improvements is exemplified. In this form the guide wheel, marked 212, is preferably at the front of the truck and the contact element, marked 229, is preferably at the rear of the truck, when the latter is being manually pulled. In the automatic propulsion of the truck the end thereof having the contact element preferably is the forward end in order that the power may be most effectively utilized. In this form of the invention the means for conveying the current to the motor, the motor itself, and the means for transmitting the power of the motor to the driving axle need not be substantially different from the corresponding elements described with reference to the two-wheel truck, and hence need not be particularly referred to herein. It is preferable, however, to change the trolley-adjusting means to that illustrated, which consists of a link 40 pivoted at one end to the sleeve, marked 125, and at its other end to an actuating handle 141 which depends from the underside of the platform of the truck and is pivoted to a bracket 142. A catch 143 is employed to engage the handle and thereby hold the sleeve and the contact element in their inoperative position, shown in dotted lines in Fig. 12. The supporting wheels 200 and 201 at the other end of the truck are mounted on separate axles 202 and 203 respectively. These axles are each journaled in lugs 204 and 205 respectively, (Fig. 13) projecting from a bolster 206. This bolster is mounted to turn pivotally with reference to the truck platform in order that the wheels 200 and 201 may conform in their movements to the bends in the guiding grooves of the way. The means whereby its movements are controlled by said grooves comprise a sleeve 206ª which partakes of the movement of the bolster and is mounted in registering position with a second sleeve 207 which is secured to the frame or platform of the truck. A guide wheel, marked 212 is mounted upon a horizontal axle 213 which is borne by a yoke 214, and a vertical spindle 215 extending from the yoke frame 216, through the sleeve 206 and into the sleeve 207. This spindle has an angular section 217 and the interior of the sleeve 206ª is correspondingly shaped whereby lateral movement communicated to the guide wheel by the bend in the guiding groove will be transmitted to said sleeve, thus turning the bolster. The contacting faces of the sleeves 206ª and 207 form substantially a fifth wheel, and the spindle 215 is round at this place, as shown at 218, in order to constitute a pivot for the turning movement. It will be noted that a space 219 is provided in the sleeve 207 for vertical movement of the spindle, which movement takes place during the adjustment of the guide wheel 212 into and out of its operative position. Preferably a spring 220 is provided around the spindle to hold the guide wheel yieldably against the surface of the way. It is also preferred to provide the upper end of the spindle with a head 221 which is seated upon a shoulder 222 in the sleeve 207. In this type of truck, a handle 223 is provided for convenience in the manual propulsion of the same. This handle is suitably connected with the bolster in order to serve as a means for guiding the truck when the latter is being manually propelled. The illustrated connection consists of a yoke the members of which are designated 224 and 225. To this yoke the lower end of the handle 223 is pivoted at 226 in order that the handle may be turned upward when the truck is being electrically propelled. The handle is held in this position by a pivoted latch 227 and a lug 228. It is preferred to connect the handle 223 with the guide wheel in such a manner that the latter will be raised to its inoperative position automatically by the lowering of the handle for use. A convenient means for this purpose is illustrated and comprises a fork 229ª secured at one end to a projection 229ᵇ from the handle, and having the other ends of its arms provided with pins 230 which extend into a groove 231 in the housing or yoke frame 216. This groove 231 is prolonged sufficiently to enable the housing or yoke frame to turn pivotally with the bolster under the control of the guiding groove. It will be noted that the connection is such that when the handle 223 is lowered the yoke 229 will be raised and will correspondingly elevate the guiding wheel, until its circumferential flange is above the plane of the way, and that when the handle is raised the spring 220 will press the guide wheel and its supporting elements downward and hold it in operative position, the latch 227 and lug 228 acting to hold the handle up whereby accidental raising of the guide wheel is prevented. While I regard this adjusting of the guide wheel as desirable, yet it is not wholy essential, and connection of the handle with the guide wheel for the purpose of adjusting the latter may be omitted. In this case the guide wheel may be adjusted by a separate instrumentality, or it may be permitted to run on the surface of the way while the truck is being manually propelled, as desired.

The preferred construction of the elevators and the lowerers is shown best in Figs. 2 and 6. Each comprises as a principal part thereof, a pair of endless moving sections $a$ arranged at opposite sides of its longitudinal center and each having its surface interrupted to form pockets for the wheels of the trucks. As here shown, each section is composed of a series of spaced slats 100, each end of which is connected to a link 101 of an endless chain 102 of suitable construction. This chain passes over sprockets 103 and 104, respectively mounted at the base and top of the elevator or lowerer. At the longitudinal center, there is a channel 105 in which travels an endless chain 106 having upwardly projecting lugs 107 at proper intervals. This chain engages sprockets 108 and 109, the former of which is located at the base of the traveling platform in advance of the sprocket 103, while the sprocket 109 is arranged at the top thereof, rearward of the sprocket 104. The sprockets 103 and 108 are arranged in approximately the same horizontal plane and the sprockets 104 and 109 similarly are horizontally alined, in order that the receiving and delivering portions of the elevator or lowerer will be approximately horizontal, the inclination commencing at a point near the base thereof rearward of the sprocket 103 and terminating at a place near the top of the same in advance of the sprocket 104. These horizontal portions also are level with the floor or ways whereby the trucks may be run onto and off of the traveling platforms with ease and without shock. The inclined portions of the elevator, (and the corresponding portion of the lowerer) are preferably at an angle of about 100 degrees and their horizontal receiving and delivering ends are in the plane of the respective ways or floors.

It will be observed that the slats 100 are shown as sufficiently spaced apart and as having their confronting faces so beveled as to provide between them seats designated 110 conforming in a measure to the curvature of the wheels of the truck and serving to restrain movement of the truck upon the platform. The engagement of the lugs 107 with the sleeve 25 also helps to restrain movement of the truck upon the platform while it is passing from one level to the other, the truck being so arranged that the sleeve will be in front of the lug with which it is in contact while being elevated and will be back of said lug while being lowered.

As already stated, switches or branch lines are interposed between the main line or lines and the traveling platforms and it is apparent that a truck intended to be conveyed from one level to the other will thereby be diverted from the main line at a place adjacent to the elevator or lowerer and can readily be engaged with the latter, preferably by an attendant stationed at this point. It is preferred to form the longitudinal members of the elevator or lowerer of suitably disposed angle irons or channel irons adapted to provide channels or rails for supporting and guiding of the chains. The elevator and lowerer are driven by a motor of any suitable description suitably connected therewith.

It is preferred in practice to bevel the end wall of the groove of each branch line in order that it may act automatically to raise the contact element out of the groove at the discharging end of said branch line, and to so arrange this groove in the platform that the truck may lose its impetus after it has left the branch and before it reaches its destination. This will prevent accident in the event that an attendant is not ready to handle a truck at the moment it is delivered. If desired, however, the groove may be prolonged beyond the conductor sufficiently to enable the truck to lose its impetus before it reaches the end of the groove. It is also desirable to provide each truck with means for indicating its destination. This part of the invention is not herein claimed but for the sake of completeness of disclosure, I have considered it to be expedient to show one suitable form of indicating means in Fig. 7. This comprises a plurality of drums 300 and 301 having suitable indicating characters thereon, such as numerals for example; one drum relating to the tracks or floors, while the other relates to the switches. These indicators are preferably arranged below the floor space of the truck, in order that they may be protected and will not interfere with the loading of baggage or freight, and their heads 302 and 303 are mounted in sleeves 304 and 305 and are knurled. They are therefore accessible from above and can readily be turned to expose their numbers which are seen through openings 306 and 307 at the front of the truck.

It is believed that the construction, operation and advantages of my present invention will be clearly understood from the foregoing description and it will be noted that I have provided one which reduces the employment of manual attendance to a minimum, will save time in the transfer of freight or baggage to and from railway cars and other places, reduces to a minimum any interference with floor space and embodies trucks which can be operated manually as well as electrically and also enables the handling of freight and baggage on a plurality of floors all in a most economical and expeditious manner.

Having now described the invention what I believe to be new and desire to secure by Letters Patent, is:—

1. In a system of the class described, a way having a groove, a propelling means in operative relation with the groove, a wheeled carrier having an element adapted to extend into the groove and to be engaged by the propelling means, means arranged at an inclination with the first way and adapted to conduct the carriers between the plane thereof and a different plane, and a switch in the way, adapted to control the movement of the carriers between the propelling means of the way and the inclined means.

2. In a system of the kind described, an upper way having an opening, a lower way, a wheeled carrier movable upon each of said ways and traveling means for transporting the carrier from one way to the other, the transporting means comprising endless flexible members at the sides thereof, members connecting the flexible members with each other and arranged to form a floor which supports the carrier and elements for causing said members to traverse an inclined path between said ways.

3. In a system of the kind described, an upper way and a lower way, the upper way having an opening, a wheeled carrier movable upon each of said ways, an inclined traveling conductor for transferring the carrier from one way to the other, said conductor extending through the opening in the upper way, each way having a groove and said carrier having a means which projects into said groove, whereby its motion is directed.

4. In a system of the kind described, an upper way and a lower way, the upper way having an opening, a wheeled carrier movable upon each of said ways, an inclined traveling conductor for transferring the carrier from one way to the other, said conductor extending through the opening in the upper way, each way having a groove, power means below the surface of each way, and an element projecting from the carrier and traveling in said grooves and engaging said power means, for transmitting power to the carrier.

5. In a system of the kind described, an upper way and a lower way, the upper way having an opening, a wheeled carrier movable upon each of said ways, an inclined traveling conductor for transferring the carrier from one way to the other, said conductor extending through the opening in the upper way, each way having a groove, power means below the surface of each way, and guiding means projecting from opposite ends of the carrier and traveling in the grooves, one of said guiding means provided with a means for engaging the power means.

6. In a system of the kind described, an upper way and a lower way, the upper way having an opening, a wheeled carrier movable upon each of said ways, an inclined traveling conductor for transferring the carrier from one way to the other, said conductor extending through the opening in the upper way, one of said ways having a groove and the carrier having an element to project therein and direct its motion, and switches tapping said groove and movable to divert the carrier from its operative relation therewith.

7. In a system of the kind described, an upper way and a lower way, the upper way having an opening, a wheeled carrier movable upon each of said ways, an inclined traveling conductor for transferring the carrier from one way to the other, said conductor extending through the opening in the upper way, each of said ways having a groove and the carrier having an element to project therein and direct its motion, and switches tapping each of said grooves and movable to divert the carrier from its operative relation therewith.

8. In a system of the kind described, an upper way and a lower way, the upper way provided with a plurality of openings, a wheeled carrier movable upon said ways, endless traveling conductors connecting the ways with each other and extending into said openings, the upper way having a groove between the upper ends of the platforms and the lower way having a groove between the lower ends of the platforms and means projecting from the carrier into said grooves, whereby the motion of the carrier is directed.

9. In a system of the kind described, an upper way and a lower way, the upper way provided with a plurality of openings, a wheeled carrier movable upon said ways, endless traveling conductors connecting the ways with each other and extending into said openings, the upper way having a groove between the upper ends of the platforms and the lower way having a groove between the lower ends of the platforms means projecting from the carrier into said grooves, whereby the motion of the carrier is directed, and switches acting on said means for diverting the carrier from operative relation with said grooves.

10. In a system of the kind described, an upper way and a lower way, the upper way provided with a plurality of openings, a wheeled carrier movable upon said ways, endless traveling conductors connecting the ways with each other, and extending into said openings, the upper way having a groove between the upper ends of the platforms and the lower way having a groove between the lower ends of the platform, power means below the surface of each way, and an element projecting from the carrier and traveling in said grooves and engaging said power-means, for transmitting power to the carrier.

11. In a system of the kind described, an upper way and a lower way, the upper way provided with a plurality of openings, a wheeled carrier movable upon said ways, endless traveling conductors connecting the ways with each other, and extending into said openings, the upper way having a groove between the upper ends of the platforms and the lower way having a groove between the lower ends of the platform, power means below the surface of each way, and guiding means extending from opposite ends of the carrier and traveling in said grooves, one of said guiding means having a means to engage the power-means.

12. In a system of the kind described, an upper way and a lower way, the upper way provided with a plurality of openings, a wheeled carrier movable upon said ways, endless traveling conductors connecting the ways with each other, and extending into said openings, the upper way having a groove between the upper ends of the platforms and the lower way having a groove between the lower ends of the platforms, power means below the surface of each way, guiding means extending from opposite ends of the carrier and traveling in said grooves, one of said guiding means having a means to engage the power means and switches acting on the guiding means and adjustable to divert the carrier from its cooperative relation with the grooves at any one of different places along the lengths of the latter.

13. In a system of the kind described, an upper way and a lower way, a wheeled carrier movable upon either of said ways, an endless inclined traveling conductor for transferring the carrier from one way to the other, and means for directing the course of travel of the carrier upon each way.

14. In a system of the kind described, an upper way and a lower way, a wheeled carrier movable upon either of said ways, an inclined traveling conductor for transferring the carrier from one way to the other, each of said ways having a main line groove provided at intervals with switches, and means projecting from the carrier and traveling in said grooves for directing its motion.

15. In a system of the kind described, an upper way having an opening, a lower way, a wheeled carrier movable upon each of said ways and endless traveling means for transporting the carrier from one way to the other, said means extending into said opening and comprising longitudinal flexible elements, elements connecting the longitudinal elements with each other and arranged to form a floor for supporting the carrier and guiding and operating means for said elements, arranged to cause the latter to traverse a path which is approximately in the plane of the upper way for a part of its length and is inclined thence toward the lower way.

16. In a system of the kind described, a plurality of ways arranged upon different levels, a wheeled carrier, means for moving the carrier over the ways in defined courses of travel, and endless traveling means for transporting the carrier from one way to the other.

17. In a system of the kind described, a plurality of ways arranged upon different planes, a wheeled carrier, means for moving the carrier over the ways in defined courses of travel, and a plurality of endless traveling means for transporting the carrier from one way to the other, the latter means traveling in opposite directions.

18. In a system of the kind described, an upper way and a lower way, each having main lines provided with grooves, the upper way provided with a plurality of openings, wheeled carriers movable upon said ways, and having elements projecting into said grooves, and endless platforms connecting the ways with each other and extending into said openings, said platforms being moved in directions which cause them respectively to convey the carriers downward and upward.

19. In a system of the kind described, a way having an endless groove, a second way having a groove, a wheeled carrier, means for moving the carrier upon the ways, means projecting from the carrier and traveling in said groove for defining the course of travel of the carrier, and an endless traveling means for transporting the carrier from one way to the other.

20. In a system of the kind described, a way having an endless groove, a second way having a groove, a wheeled carrier, means for moving the carrier upon the ways, means projecting from the carrier and traveling in said groove for defining the course of travel of the carrier, means for diverting it from its operative relation with the groove, and an endless traveling means for transporting the carrier from one way to the other.

21. In a system of the kind described, a way having an endless groove, a second way having a groove, one of said ways being arranged above the plane of the other, a wheeled carrier, means for moving the carrier upon the ways, means projecting from the carrier into said grooves for defining the course of travel of the carrier, and a plurality of endless traveling means, respectively adapted to transport the carrier upward and downward from one way to the other.

22. In a system of the kind described, a way having an endless groove, a second way having a groove, one of said ways being arranged above the plane of the other, a wheeled carrier, means for moving the carrier upon the ways, means projecting from the carrier into said grooves for defining the course of travel of the carrier, and a plurality of endless traveling means, respectively adapted to transport the carrier upward and downward from one way to the other, said ways having switches tapping said grooves.

23. In a system of the kind described, a way arranged between railway tracks and provided with a groove extending lengthwise thereof, a wheeled carrier movable upon said way and having means adapted to travel in said groove, and means leading from said way and adapted to transport the carrier relatively thereto.

24. In a system of the kind described, a plurality of ways spaced apart, each provided with a lengthwise groove, a way common to those first mentioned and provided with a groove communicating with those of the same, and a wheeled carrier adapted to travel on said ways and having an element which travels in said grooves.

25. In a system of the class described, a plurality of ways arranged in different planes, a traveling platform extending from one way to the other and having an inclined section between said ways and also having receiving and delivering portions in the planes of the ways, respectively, a wheeled carrier adapted to be transferred on said platform from one way to the other and means in said ways for moving the carrier thereover to and from said platform.

26. In a system of the class described, a plurality of ways arranged in different planes, a platform which travels in an inclined plane from one way to the other and has receiving and delivering portions in the planes of the ways, respectively, a wheeled carrier adapted to be transferred on said platform from one way to the other, and endless traveling means in said ways for moving the carrier thereover to and from said platform, said means provided with switches.

27. In a system of the kind described, a plurality of ways spaced apart, each provided with a lengthwise groove, and switches tapping the same at intervals, a way common to those first mentioned and provided with a groove communicating with those of the same, and a wheeled carrier adapted to travel on said ways and having an element which travels in said grooves.

28. In a system of the kind described, a plurality of ways spaced apart, each provided with a lengthwise groove and switches tapping the groove at intervals, a way common to those first mentioned and provided with a groove, switches between the latter groove and the adjacent ends of those first mentioned, and a wheeled carrier adapted to travel on said ways and having an element which travels in said groove.

29. In a system of the kind described, a plurality of ways spaced apart, each provided with a lengthwise groove and switches tapping the groove at intervals, a way common to those first mentioned and provided with a groove, switches between the latter groove and the adjacent ends of those first mentioned, a wheeled carrier adapted to travel on said ways, power-means in operative relation with the grooves of the ways, and means projecting from opposite ends of the carrier and traveling in said groove, one of said propecting means being adapted to contact with the power-means and to transmit power therefrom.

30. In a system of the kind described, a plurality of ways spaced apart, each provided with a lengthwise groove, a way common to those first mentioned and provided with a groove common to those of the same, a wheeled carrier adapted to travel on said ways and having an element which travels in said grooves, and an endless traveling conductor, movable inclinatorily relatively to said way for transporting the carrier.

31. In a system of the kind described, a plurality of ways spaced apart, each provided with a lengthwise groove, a wheeled carrier adapted to travel on said ways and provided with an element to travel in said grooves, a plurality of traveling platforms connected at one end with said ways, respectively, and adapted to transport the carriers relatively thereto, and means common to the platforms for conducting the carrier relatively thereto.

32. In a system of the kind described, a plurality of ways spaced apart, each provided with a lengthwise groove, a wheeled carrier adapted to travel on said ways and provided with an element to travel in said grooves, a plurality of traveling platforms connected at one end with said ways, respectively, and adapted to transport the carriers relatively thereto, and a way common to the several platforms, adjacent the other end thereof and having a main line with switches for said platforms.

33. In a system of the kind described, a plurality of ways spaced apart, each provided with a lengthwise groove, a way common to those first mentioned and provided with a groove common to those of the same, a wheeled carrier having an element adapted to travel in the grooves, switches for controlling the movement of the carrier between the latter groove and those first mentioned, a way located upon a different plane, an endless traveling conductor movable in an inclined plane for transporting the carrier between the last-mentioned way and the one common to those first mentioned, and a plurality of endless traveling conductors movable inclinatorily between said first-mentioned ways, said last-mentioned way having a groove and switches for directing the course of travel of the carrier therein between the conductors.

34. In a system of the kind described, a plurality of ways spaced apart, each provided with a lengthwise groove, a way common to those first-mentioned and provided with a groove common to those of the same, each of said grooves having switches, power means operatively related to the grooves, a wheeled carrier having an element adapted to travel in the grooves, and engage the power means, a way located upon a different plane, an endless traveling conductor movable in an inclined plane for transporting the carrier between the last-mentioned way and the one common to those first mentioned, and a plurality of endless traveling conductors movable inclinatorily between said last-mentioned ways, said last-mentioned way having a groove and switches and also having a power means operatively related to the groove for directing the course of travel of the carrier thereon between the conductors.

35. In a system of the kind described, a way having portions for inbound and outbound matter, respectively, said way having a groove extending within and between said portions, a carrier adapted to travel on the way and having an element to travel in the groove, and inclined traveling platforms for transporting the carrier between said way and a different plane.

36. In a system of the kind described, a way having portions for inbound and outbound matter respectively, a second way arranged on a train level, each of said ways having a groove and switches tapping its groove, a carrier adapted to travel on the ways and having an element to travel in the grooves, and means for transporting the carrier between the ways.

37. In a system of the kind described, a way having portions for inbound and outbound matter respectively, a plurality of ways arranged on a train level, a way common to the latter, each of said ways having a groove and switches, an inclined traveling conductor between the first mentioned way and said common way, a plurality of inclined conductors between said first mentioned way and said plurality of ways, respectively, and a wheeled carrier adapted to move on said ways and to be transported by the conductors, said carrier having an element which travels in said grooves.

38. In a system of the kind described, a way having portions for inbound and outbound matter respect............ ...y of ways arranged on a train level, a way common to the latter, each of said ways having a groove and switches, an inclined traveling conductor between the first mentioned way and said common way, a plurality of inclined conductors between said first mentioned way and said plurality of ways, respectively, and a wheeled carrier adapted to move on said ways and to be transported by the conductors, said carrier having an element which travels in said grooves and each of which ways having a power-means arranged beneath its surface and in position to be engaged by said element.

39. In a system of the kind described, a floor interrupted to provide a team space and communicating portions at opposite sides of said space, said floor having a groove in each of said portions and in the part of the floor through which said portions have communication with each other, said groove being tapped at intervals by switches, and a wheeled carrier adapted to travel on said floor and having an element to travel in said groove.

40. In a system of the kind described, a floor interrupted to provide a team space and communicating portions at opposite sides of said space, said floor having a groove in each of said portions and in the part of the floor through which said portions have communication with each other, said groove being tapped at intervals by switches, and a wheeled carrier adapted to travel on said floor and having an element to travel in said groove and said groove having a power means to be engaged by said element.

41. In a system of the class described, a grooved way on the train level, with switches leading to the cars, a second grooved way having portions for inbound and outbound matter, on a different level, with switches at intervals, inclined traveling conductors connecting the train-level way with the inbound and outbound portions respectively of the second way and movable carriers adapted to said ways and conductors.

42. In a system of the class described, a grooved way on a train level, with switches leading to the cars, a second grooved way having portions for inbound and outbound matter, on a different level, with switches at intervals, a third grooved way on another level, inclined traveling conductors connecting the train-level way with the inbound and outbound portions respectively of the second way, inclined traveling conductors connecting the train level way and the inbound portion with the storage-way, and an inclined conductor connecting the storage-way with the outbound portion.

43. In a system of the kind described, a plurality of floors arranged on a receiving and delivering plane, a storage plane and a train level respectively, the last-mentioned floor having a series of grooves spaced apart and being interrupted between the grooves to provide spaces for trains, said floor also having a groove common to those first mentioned, each of the other floors having grooves, switches, power means beneath the floors and operatively related to said grooves, a wheeled carrier adapted to travel on said floors and having an element of travel in the grooves and engage the power element, means connecting the common groove with the first mentioned floor, means connecting the latter floor with the floor on the storage plane, a second means connecting the latter floor with the first-mentioned floor, a plurality of means severally connecting the latter with the grooved portions on the train level, each of said means being adapted to transport said carrier between the floors.

44. In a system of the kind described, a way arranged between railway tracks, and provided with a groove extending lengthwise thereof, a wheeled carrier movable upon said way and having means adapted to travel in said groove and means leading from said way for transporting the carrier to a different plane.

45. In a system of the kind described, a way arranged between railway tracks and provided with grooves having switches leading toward cars on said tracks, and with a groove connecting those first mentioned with each other, a second way, inclined conductors connecting the ways with each other and traveling in opposite directions, one of said conductors being operatively related to said connecting groove and the other to one of the other grooves, said second way having a groove between the receiving end of one conductor and the delivering end of the other conductor, and a wheeled carrier movable on said ways and adapted to be transported by said conductors, said carrier having an element to travel in the grooves.

46. In a system of the kind described, a way arranged between railway tracks and provided with grooves having switches leading toward cars on said tracks, and with a groove connecting those first mentioned with each other, a second way, inclined conductors connecting the ways with each other and traveling in opposite directions, one of said conductors being operatively related to said connecting groove and the other to one of the other grooves, said second way having a groove between the receiving end of one conductor and the delivering end of the other conductor, and a wheeled carrier movable on said ways and adapted to be transported by said conductors, said carrier having an element to travel in the grooves and said ways having power means disposed below the surfaces thereof and in position to be engaged by said element.

47. In a system of the kind described, a series of ways spaced apart and adapted to admit trains between them, a second way arranged in a different plane, a carrier adapted to travel on said ways, and inclined conductors for transporting the carrier between said ways.

48. In a system of the kind described, a series of ways spaced apart and adapted to admit trains between them, a second way arranged in a different plane, a carrier adapted to travel on said ways, and inclined conductors for transporting the carrier between said ways, said conductors being relatively so disposed that one end of each spaced way will be connected with the second way by a separate conductor, while the other end of each spaced way will be connected with the second way by a conductor common to all.

49. In a system of the kind described, a series of ways spaced apart and adapted to admit trains between them, a second way arranged in a different plane, a carrier adapted to travel on said ways, and inclined conductors for transporting the carrier between said ways, said conductors being relatively so disposed that one end of each spaced way will be connected with the second way by a separate conductor, while the other end of each spaced way will be connected with the second way by a conductor common to all, said second way having a groove leading from the last mentioned conductor and tapped by switches adjacent to the other conductors, and said carrier having an element to travel in said groove.

50. In a system of the kind described, a series of ways spaced apart and adapted to admit trains between them, a second way arranged in a different plane, a carrier adapted to travel on said ways, and inclined conductors for transporting the carrier between said ways, said conductors being relatively so disposed that one end of each spaced way will be connected with the second way by a separate conductor, while the other end of each spaced way will be connected with the second way by a conductor common to all, said second way having a groove leading from the last mentioned conductor and tapped by switches adjacent to the other conductor, and said carrier having an element to travel in said groove, each of said spaced ways having grooves tapped by switches leading toward cars, and a way having a groove common to all of the latter, and said carrier having an element to travel in said grooves.

51. In a system of the kind described, a wheeled carrier, a plurality of grooved ways spaced apart and having switches, a grooved way common to all of the same, a way arranged in a different plane, means connecting said common way with the last-mentioned way, adapted to transport the carrier between the same, a second means connecting the common way with said last-mentioned way and adapted to transport the carrier between the same, a plurality of means, respectively connecting said last-mentioned way with the spaced ways, said last mentioned way having a groove leading from the first mentioned transporting means toward each of those which are connected with the spaced ways, and tapped by switches adjacent the same, said ways also having a second groove leading from the second mentioned transporting means to its first mentioned groove, and tapped at intervals by switches; said carrier having means which travels in said groove and directs its motion therefrom.

52. In a system of the class described, a plurality of ways arranged in different planes, a wheeled carrier, means for moving the carrier over said ways, and an inclined traveling platform which extends from one way to the other and is adapted to support the carrier, said platform having pockets for the lower portions of the wheels of the carrier.

53. In a system of the class described, a plurality of ways arranged in different planes, a wheeled carrier, means for moving the carrier over said ways, and an inclined traveling platform which extends from one way to the other and is adapted to support the carrier, and means movable with the platform, engaging the carrier and restraining relative movement between the same and the platform.

54. In a system of the class described, a plurality of ways arranged in different planes, a wheeled carrier, means for moving the carrier over said ways, a platform which travels in an inclined plane from one way to the other and is adapted to support the carrier, and an endless traveling device movable with the platform and having projections which engage the carrier and restrain relative movement between the same and the platform.

55. In a system of the class described, a plurality of ways arranged in different planes, a wheeled carrier having a pendent element, means in said ways engaging said element and propelling the carrier thereover, a platform which travels in an inclined plane from one way to the other and is adapted to support the carrier, and means movable with the platform, engaging said pendent element and restraining relative movement between the carrier and the platform.

56. A system of the class described, comprising a wheeled carrier, and a plurality of elements respectively disposed to conduct the carrier along a level and from said level to a different one, and a switch arranged adjacent to the junction of said elements and intermediate the length of the one first-mentioned.

57. A system of the class described, comprising a wheeled carrier and means for moving the same, including a plurality of traveling sections one of which is arranged at an inclination with respect to the other, and a switch arranged at the junction of said sections, intermediate the length of one of the same and operable to direct the carrier to or from the latter at said junction.

In testimony whereof I have hereunto set my hand in presence of two subscribing witnesses.

MORRIS U. BERNHEIM.

Witnesses:
  E. PALMER BERNHEIM,
  A. B. FLARSWEIN.